US 6,986,959 B2

(12) United States Patent
Clark et al.

(10) Patent No.: US 6,986,959 B2
(45) Date of Patent: Jan. 17, 2006

(54) LOW TEMPERATURE FUEL CELL POWER PLANT OPERATION

(75) Inventors: Thomas M. Clark, Suffield, CT (US); Paul R. Margiott, South Windsor, CT (US); Albert P. Grasso, Vernon, CT (US); Richard D. Breault, North Kingstown, RI (US); Leslie L. Van Dine, Manchester, CT (US); Margaret M. Steinbugler, East Windsor, CT (US); Edward J. Bludnicki, Wallingford, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 95 days.

(21) Appl. No.: 10/624,190

(22) Filed: Jul. 22, 2003

(65) Prior Publication Data

US 2005/0019628 A1    Jan. 27, 2005

(51) Int. Cl.
  $H01M\ 8/04$      (2006.01)
  $H01M\ 8/00$      (2006.01)
(52) U.S. Cl. .............................. 429/22; 429/24; 429/26; 429/13
(58) Field of Classification Search ................. 429/12, 429/13, 22, 24, 26, 20
  See application file for complete search history.

(56) References Cited

U.S. PATENT DOCUMENTS

| 5,542,968 | A | 8/1996 | Belding et al. ............... 96/125 |
| 6,007,931 | A | 12/1999 | Fuller et al. ................... 429/13 |
| 6,013,385 | A | 1/2000 | DuBose ........................ 429/17 |
| 6,048,383 | A | 4/2000 | Breault et al. ................. 95/44 |
| 6,106,964 | A | 8/2000 | Voss et al. ..................... 429/20 |
| 6,274,259 | B1 | 8/2001 | Grasso et al. ................. 429/13 |
| 6,365,291 | B1 * | 4/2002 | Margiott ....................... 429/25 |
| 6,436,562 | B1 | 8/2002 | DuBose ........................ 429/13 |
| 6,475,652 | B2 | 11/2002 | Grasso et al. ................. 429/13 |
| 6,562,503 | B2 * | 5/2003 | Grasso et al. ................. 429/26 |
| 2001/0004500 | A1 | 6/2001 | Grasso et al. ................. 429/13 |
| 2001/0010872 | A1 | 8/2001 | Suzuki et al. ................. 429/12 |

* cited by examiner

Primary Examiner—Patrick Joseph Ryan
Assistant Examiner—Thomas H. Parsons
(74) Attorney, Agent, or Firm—Carlson, Gaskey & Olds

(57) ABSTRACT

A fuel cell power plant system includes the ability to operate an enthalpy recovery device even under cold conditions. A bypass arrangement allows for selectively bypassing one or more portions of the enthalpy recovery device under selected conditions. In one example, the enthalpy recovery device is completely bypassed under selected temperature conditions to allow the device to freeze and then later to be used under more favorable temperature conditions. In another example, the enthalpy recovery device is selectively bypassed during a system startup operation. One example includes a heater associated with the enthalpy recovery device. Another example includes preheating oxidant supplied to one portion of the enthalpy recovery device.

19 Claims, 3 Drawing Sheets

LOW TEMPERATURE FUEL CELL POWER PLANT OPERATION

BACKGROUND OF THE INVENTION

This invention generally relates to operating a fuel cell power plant during cold temperature conditions. More particularly, this invention relates to selectively utilizing an enthalpy recovery device based upon operating conditions of a fuel cell power plant.

Fuel cell power plants are well known and used to produce electrical power from reducing and oxidizing fluids. Fuel cell structures and fuel cell power plant arrangements are known and come in a variety of configurations. Many fuel cells utilize a proton exchange membrane (PEM) as part of a chemical process for producing electrical energy.

In proton exchange membrane fuel cells, it is important that the reactants are humidified to prevent the PEM from drying out. If the PEM were to dry out, the cell resistance increases, which lowers the fuel cell performance. Additionally, if the membrane dries out, it degrades, which results in reduced service life for the fuel cell power plant.

Moreover, it is desirable that the fuel cell power plant operate within water balance. This means that the water removed from the power plant system as vapor in the reactant exhaust streams, or as liquid across the porous water transport plates, must be equal to or less than the amount of water formed as a result of reactions within the fuel cell. In one example power plant air utilization is approximately 60–70% with an operating pressure of about 15.7 PSIA. There is a relationship between system exhaust dewpoint and system air utilization that satisfies water balance, depending on the fuel provided to the power plant. In one example where gasoline is the fuel, an exhaust temperature of 110° F. provides adequate water balance. If the exhaust temperature exceeds 110° F., there is a water deficiency and the cells will dry out. If the exhaust temperature is less than 110° F., a system water surplus results, possibly flooding the cells unless the water is removed as liquid.

Enthalpy recovery devices (ERDs) are used in fuel cell power plants to exchange heat and humidity from a process exhaust stream to a reactant inlet stream. ERDs have been used to maintain adequate water balance within fuel cell power plants.

A particular challenge is presented when the ambient temperatures are low such that water or liquid associated with or processed by the ERDs may freeze. This is possible, for example, on a vehicle including a fuel cell power plant that is located in a region where winter temperatures may be at or below freezing. Under such conditions, the enthalpy recovery device may not function as required and the power plant system water balance may not be maintained, which could result in performance degradation or a reduced service life of the system.

There is a need for a fuel cell power plant system that is capable of operating in cold conditions. This invention addresses that need.

SUMMARY OF THE INVENTION

In general terms, this invention is a fuel cell power plant system that is capable of operating in cold temperatures.

One fuel cell power plant system designed according to this invention includes a fuel cell having a first electrode that receives a fuel and a second electrode that receives an oxidant. An enthalpy recovery device has a first portion in fluid communication with the exhaust of the second electrode and a second portion in fluid communication with the air supply between the supply and the second electrode. A controller selectively controls the amount of fluid communication to at least one of the portions of the enthalpy recovery device based upon a selected condition, such as a temperature or the operation status of the power plant system.

The controller selectively bypasses the enthalpy recovery device as needed to avoid ice build up, for example, within the enthalpy recovery device.

In one example system the exhaust from the second electrode is bypassed around the first portion of the enthalpy recovery device when a temperature, such as ambient, or second electrode exit, or ERD, is below a selected threshold.

In another example, the oxidant from the supply is bypassed around the second portion of the enthalpy recovery device when a temperature, such as ambient, or second electrode exit, or ERD, is below a selected threshold or during a system startup operation.

In another example, the entire enthalpy recovery device is bypassed and allowed to freeze. Once more favorable temperatures exist, the ERD may be used as desired.

Some examples include a bypass conduit that selectively directs fluid around the enthalpy recovery device and a valve associated with the bypass conduit. The controller selectively operates the valve, depending upon the current operating and ambient (environmental) conditions to select whether the enthalpy recovery device is bypassed.

Some example systems designed according to this invention have a heater associated with the enthalpy recovery device. The heater may be operated by a controller, the inputs of which may be the fuel cell power plant operating conditions, such as temperature, or environmental conditions, such as ambient temperature and pressure. In one example, the heater comprises a resistive element that heats up responsive to current supplied to the element. In another example, current is supplied across the enthalpy recovery device and the inherent resistance within the device generates heat. In still another example, a heater comprises at least one element supported with the enthalpy recovery device that receives an exhaust from a coolant loop associated with the fuel cell. The heated exhaust taken from the coolant loop passes through the heater element and operates to heat the enthalpy recovery device.

In still another example, the air supplied to the enthalpy recovery device is preheated using heat associated with a fuel processing system that otherwise provides fuel to the first electrode of the fuel cell.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
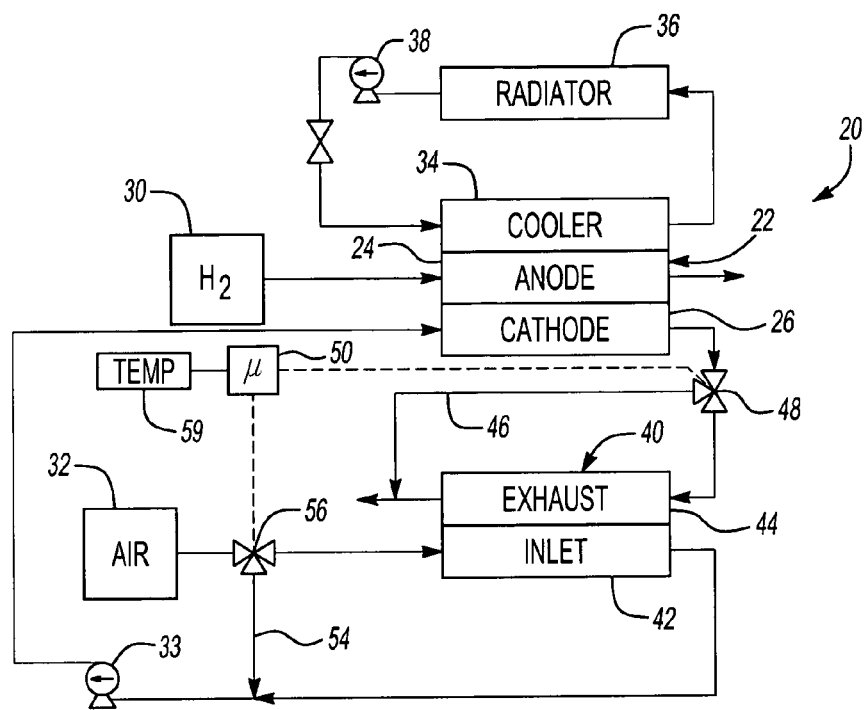
FIG. 1 schematically illustrates a fuel cell power plant system designed according to an embodiment of this invention.

FIG. 1 schematically illustrates a fuel cell power plant system 20. A fuel cell 22 includes a first electrode 24 and a second electrode 26. The example fuel cell 22 is a proton exchange membrane fuel cell stack, the operation of which is known. The first electrode 24 in this example is the fuel cell anode and receives fuel, such as hydrogen or a hydrogen-containing gas, from a fuel source 30. The second electrode 26 in this example is the cathode and receives an oxidant, such as air, from a source 32, which is provided to the cathode 26 through action of a pump 33. The anode and cathode may be a single fuel cell plate, or a plurality of plates, as known.

The illustrated example includes a coolant loop associated with the fuel cell 22. Coolant loops are known and take a variety of forms. Coolant flowing through a cooler portion 34 passes through a radiator 36, such as a conventional heat exchanger. A pump 38 maintains the desired flow through the coolant loop.

An enthalpy recovery device (ERD) 40 facilitates maintaining a required water balance within the system 20. Those skilled in the art who have the benefit of this description will be able to select from among known ERD configurations to meet the needs of their particular situation. The ERD 40 includes a first portion or chamber 42. In this example, the first portion 42 is an inlet chamber. The second portion 44 in this example is an exhaust chamber.

The second portion 44 is in fluid communication with the exhaust of the cathode 26 of the fuel cell 22. The cathode 26 exhaust is provided to and flows through the second portion 44 under most operating conditions. A bypass conduit 46 is coupled with a valve 48 that is between the cathode 26 and the second portion 44. Under selected conditions, the exhaust flow is completely bypassed through the conduit 46 around the second portion 44. Under other circumstances, only a portion of the exhaust flow is regulated through the second portion 44. The bypass 46 allows for controlling the exhaust flow through the second portion 44 according to selected temperature ranges or fuel cell power plant operating conditions. Example temperatures include the ambient temperature, an exit temperature from the cathode 26, or an ERD temperature. A controller 50 selectively operates the valve 48 to control the flow of the exhaust from the cathode 26 to the second portion 44 of the ERD 40.

The first portion 42 of the ERD 40 receives air from the air supply 32 under most operating conditions. A bypass conduit 54 is associated with a valve 56 that is positioned between the air supply 32 and the inlet side of the first portion 42. On an as-needed basis, the controller 50 preferably operates the valve 56 to selectively bypass the air from the air supply 32 around the first portion 42 of the ERD 40.

There are a variety of different circumstances during which the controller 50 selectively controls fluid flow through the ERD 40 to facilitate desired system performance. The example system includes a temperature sensor 59 that provides ambient temperature information to the controller 50. The controller 50 controls the fluid flow through the ERD 40 in the manners described below to meet the needs of a particular system configuration. In one example, the controller 50 comprises a microprocessor. Given this description, those skilled in the art will be able to develop the software code needed to program a commercially available processor to achieve a desired system operation.

In one example embodiment of this invention, the controller 50 selectively operates the valves 48 and 56 to completely bypass the ERD 40. When the ambient temperature is low enough for water to freeze, for example, completely bypassing the ERD 40 allows the water or other liquid within it to freeze. The ERD 40 remains bypassed until more favorable temperature conditions exist in this example. In one example, the ERD 40 is bypassed whenever the ambient temperature is below 20° C.

A complete bypass is not always necessary. There are some situations where one example system designed according to this invention selectively bypasses only one of the portions of the ERD 40. Further, the amount of bypass may be controlled, depending on the valves provided in a particular system. Those skilled in the art who have the benefit of this description will be able to decide how much flow is desirable given the current conditions and the configuration of their particular system.

In another example, the air from the supply 32 is bypassed through the bypass conduit 54 during system sunup conditions. This particular example recognizes that the exhaust from the cathode 26 will be heated and tend to raise the temperature of the ERD 40 even though the ambient temperature of the air from the supply 32 would tend to cool the ERD 40. Accordingly, this arrangement reduces the thermal load on the ERD during a startup condition. The controller 50 in this example preferably is programmed to operate the bypass valve 56 to bypass air through the bypass conduit 54 during startup conditions and then to allow air flow through the first portion 42 as soon as the operating temperature of the fuel cell 22 reaches a desired level. This particular technique prevents re-freezing of any moisture in the system gases flowing through the ERD 40 during startup.

In another example, the controller 50 utilizes temperature information, system pressure information or another criteria to direct only a partial stream of fluid through either portion of the ERD 40, or both. In one example, during startup from a cold condition, only part of the cold air from the supply 32 is directed through the first portion 42 of the ERD 40 to minimize the heat up time.

Figure 2:
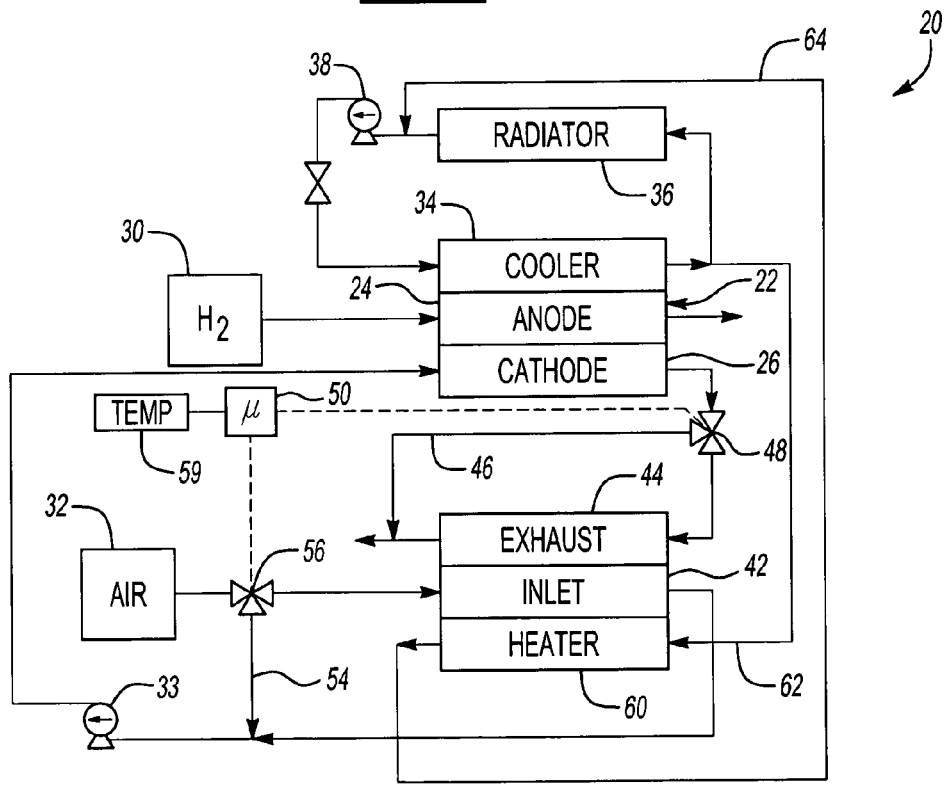
FIG. 2 schematically illustrates a modification of the embodiment of FIG. 1.

In addition to selectively directing fluid flow through the ERD 40, some example systems designed according to this invention include a heater associated with the ERD 40. The example embodiment of FIG. 2 schematically includes a heater 60 that receives at least some of the heated coolant fluid from the cooler 34 through a conduit 62. Fluid exiting the heater 60 flows through a conduit 64. In this example, the heater 60 comprises at least one heating element, such as a heat exchanger that conducts the heat from the exhaust of the cooler 34 in a manner that warms the ERD 40. In one example, the heater 60 comprises a heat exchanger associated with the structure of the ERD 40. In another example, the heater 60 comprises a plurality of elements supported within the ERD 40 through which the heated coolant from the cooler 34 flows and provides the heating function. Another example includes direct injection of a portion of the heated coolant directly into the ERD inlet 42 co-flowing within the air channels. The controller 50 in one example utilizes temperature information to control operation of the heater 60. Given this description, those skilled in the art will be able to configure the appropriate components and to program a controller to realize a heating strategy that satisfies their particular needs.

Figure 3:
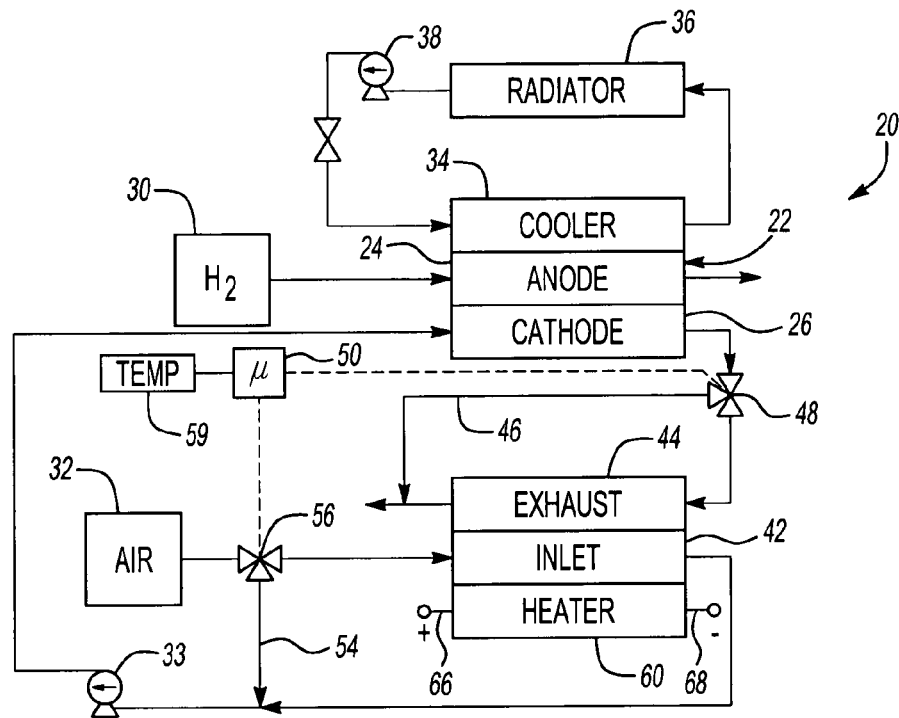
FIG. 3 schematically illustrates another modification of the embodiment of FIG. 1.

FIG. 3 shows another example embodiment where the heater 60 is an electrically resistive heater device. At least one resistive element heats up responsive to current supplied to it. This example schematically includes leads 66 and 68 across which current is supplied to the heater element. The current for operating the heater 60 may be taken from the electrical output of the fuel cell 22, for example. In one example electric resistant heater elements are supported within the ERD between groups of approximately 20 ERD plates.

Figure 4:
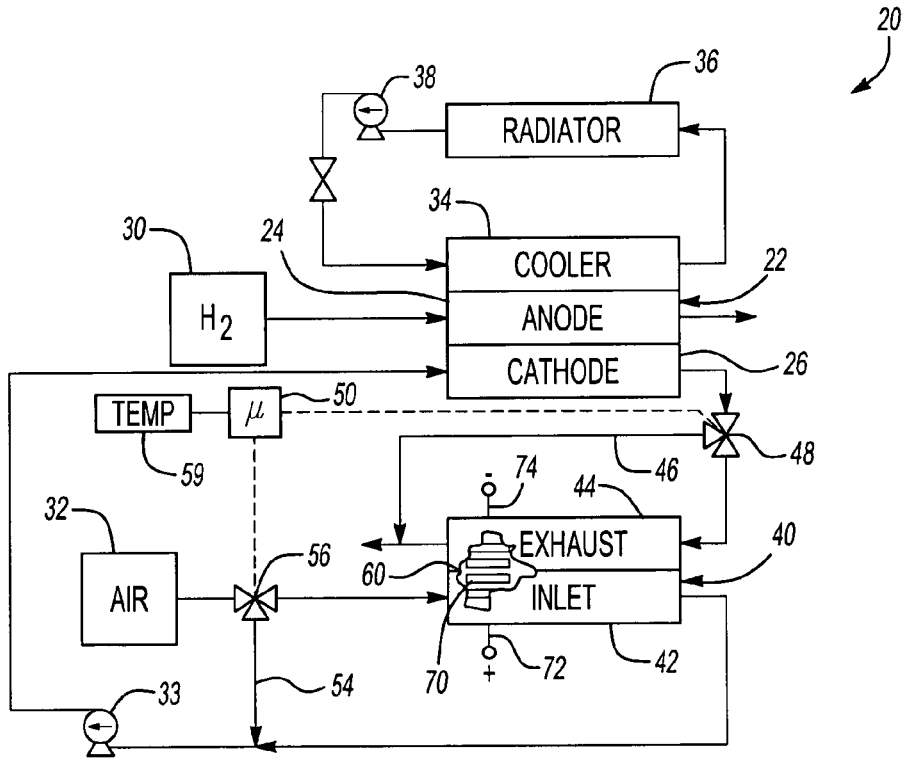
FIG. 4 illustrates another alternative arrangement designed according to the embodiment of FIG. 1.

FIG. 4 schematically illustrates another arrangement. In this example, the ERD 40 is made of porous graphite layers 70 that have intrinsic electrical conductivity. Applying a direct current through the ERD 40 from one side to the other, using leads 72 and 74, for example, heats the ERD 40 by the heat build up associated with the resistance of the layers 70. The fuel cell 22 provides the power to heat the ERD 40 in one example.

Figure 5:
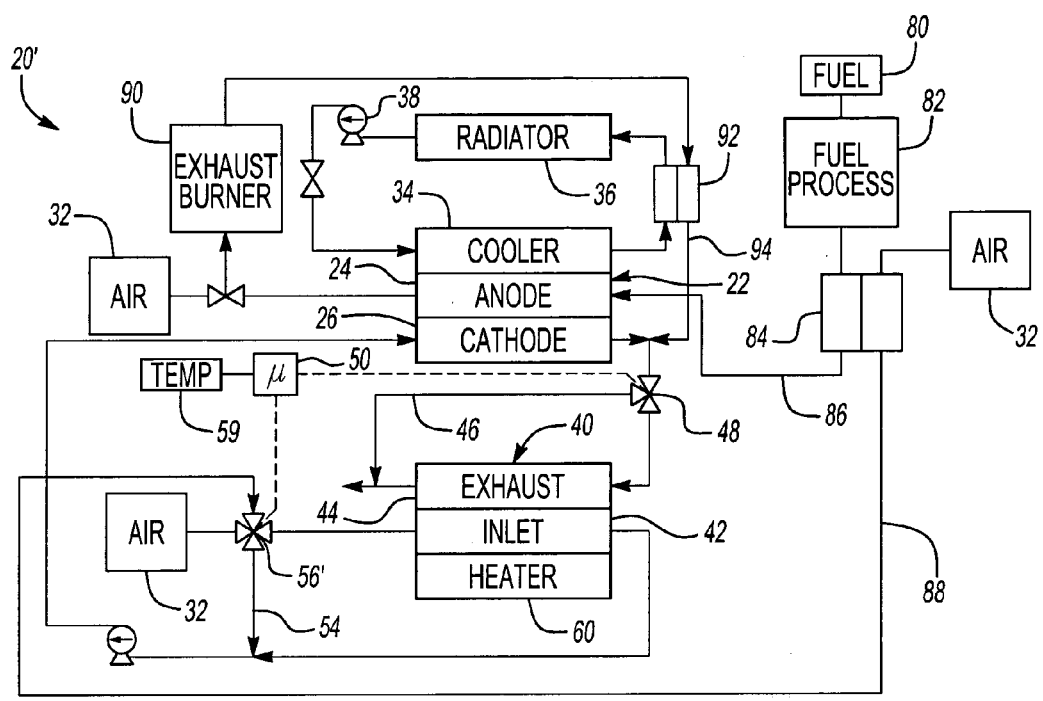
FIG. 5 schematically illustrates an alternative fuel cell power plant system designed according to an embodiment of this invention.

The examples of FIGS. 1–4 are particularly well suited for a hydrogen-air power plant configuration. The example schematically shown in FIG. 5 is particularly well suited for a hydrocarbon-air power plant configuration. The system 20' operates much like the system 20 described above. Those skilled in the art appreciate the differences between a hydrogen-air and a hydrocarbon-air power plant configuration.

The fuel supply 80 in this example provides fuel to a conventional fuel processing arrangement 82. A heat exchanger 84 associated with the fuel processing arrangement 82 provides fuel to the anode 24 through a conduit 86. Another side of the heat exchanger 84 is coupled with a conduit 88 that is coupled with the valve 56', which controls air supply to the first portion 42 of the ERD 40. The air from the supply 32 is at least partially preheated using the heat exchanger 84 under selected temperature conditions. In one example, whenever a selected temperature, such as the ambient temperature, is at or below 0° C., the controller 50 operates the valve 56' such that the air from the supply 32 is preheated using the heat exchanger 84 before being provided to the first portion 42 of the ERD 40.

Another feature of the example embodiment of FIG. 5 includes utilizing an output from an exhaust burner 90 as part of the exhaust stream flowing through the valve 48 to the second portion 44 of the ERD 40. The anode exhaust burner stream passes through a heat exchanger 92 associated with the coolant loop prior to passing through a conduit 94 on route to the inlet side of the second portion 44 of the ERD 40. The flow of such exhaust is combined with the exhaust of the cathode 26 and controlled by operation of the valve 48 either to the second portion 44 or the bypass conduit 46 using temperature criteria as described above, for example.

A variety of techniques have been disclosed for operating a fuel cell power plant system under cold conditions. More than one of the disclosed techniques may be used in combination as may be required to operate a particular system configuration. Those skilled in the art who have the benefit of this description will be able to implement what works best for a given system.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

What is claimed is:

1. A fuel cell power plant system, comprising:
   a fuel cell having a first electrode that receives a fuel including hydrogen and a second electrode that receives an oxidant from a supply and outputs exhaust;
   an enthalpy recovery device having a first portion in fluid communication with the oxidant supply between the supply and the second electrode and a second portion in fluid communication with the exhaust of the second electrode;
   a controller that selectively controls the amount or fluid communication to at least one of the portions of the enthalpy recovery device based upon a selected condition; and
   a heater for adding heat to the enthalpy recovery device wherein the heater comprises an oxidant heater and wherein the controller selectively controls the oxidant supply such that the oxidant is at least partially heated by the oxidant heater prior to being provided to the first portion.

2. The system of claim 1, wherein the controller prevents the second portion from receiving the exhaust from the second electrode when the selected condition exists and wherein the selected condition comprises a temperature being below a selected threshold.

3. The system of claim 1, wherein the controller prevents the first portion from receiving the oxidant from the supply when the selected condition exists and wherein the selected condition is at least one of a temperature being below a selected threshold or a system start up operation.

4. The system of claim 1, including an exhaust conduit that directs exhaust from the second electrode to the second portion, a bypass conduit that directs the exhaust away from the second portion and a valve associated with the conduits, the controller operating the valve to selectively allow the second electrode exhaust to flow to the second portion.

5. The system of claim 1, including an oxidant supply conduit that directs oxidant from the supply through the first portion to the second electrode, a bypass conduit that directs the oxidant from the supply directly to the second electrode and a valve associated with the conduits, the controller operating the valve to selectively allow the oxidant from the supply to pass through the conduits to control oxidant flow through the first portion.

6. The system of claim 1, wherein the controller selectively reduces the amount of fluid communication to at least one of the portions of the enthalpy recovery device based upon at least one of a temperature or a pressure within the system.

7. The system of claim 1, including a fuel processing device that has a heat exchanger through which the fuel passes prior to being provided to the first electrode arid wherein the oxidant hearer comprises the hear exchanger.

8. The system of claim 1, including an exhaust burner that processes exhaust from the first electrode and wherein an output from the exhaust burner is selectively supplied to the second portion of the enthalpy recovery device.

9. A fuel cell power plant system, comprising:
   a fuel cell having a first electrode that receives a fuel including hydrogen and a second electrode that receives an oxidant from a supply and outputs exhaust;
   an enthalpy recovery device having a first portion in fluid communication with the oxidant supply between the supply and the second electrode and a second portion in fluid communication with the exhaust of the second electrode;

a controller that selectively controls the amount of fluid communication to at least one of the portions of the enthalpy recovery device based upon a selected condition; and a heater for adding heat to the enthalpy recovery device wherein the heater heats coolant and wherein the heated coolant and inlet oxidant flow together within the enthalpy recovery device.

10. A fuel cell power plant system, comprising:

a fuel cell having a first electrode that receives a fuel including hydrogen and a second electrode that receives an oxidant from a supply and outputs exhaust;

an enthalpy recovery device having a first portion in fluid communication with the oxidant supply between the supply and the second electrode and a second portion in fluid communication with the exhaust of the second electrode;

a controller that selectively controls the amount of fluid communication to at least one of the portions of the enthalpy recovery device based upon a selected condition; and a heater for adding heat to the enthalpy recovery device wherein the heater comprises at least one resistive element that produces heat responsive to current supplied to the element, the heat from the resistive element warming at least one of the portions.

11. A fuel cell power plant system, comprising:

a fuel cell having a first electrode that receives a fuel including hydrogen and a second electrode that receives an oxidant from a supply and outputs exhaust;

an enthalpy recovery device having a first portion in fluid communication with the oxidant supply between the supply and the second electrode and a second portion in fluid communication with the exhaust of the second electrode;

a controller that selectively controls the amount of fluid communication to at least one of the portions of the enthalpy recovery device based upon a selected condition; and a heater for adding heat to the enthalpy recovery device wherein the first and second portions of the enthalpy recovery device comprise a conductive material and the heater comprises at least one electrical connection between one side of the first portion and one side of the second portion, the electrical connection allowing current to pass through the first and second portions.

12. A fuel cell vower plant system, comprising:

a fuel cell having a first electrode that receives a fuel including hydrogen and a second electrode that receives an oxidant from a supply and outputs exhaust;

an enthalpy recovery device having a first portion in fluid communication with the oxidant supply between the supply and the second electrode and a second portion in fluid communication with the exhaust of the second electrode;

a controller that selectively controls the amount of fluid communication to at least one of the portions of the enthalpy recovery device based upon a selected condition; and a heater for adding heat to the enthalpy recovery device, including a cooler associated with the fuel cell that exhausts heated coolant and wherein the heater comprises at least one heater element associated with the enthalpy recovery device, the heater element receiving the heated coolant from the cooler.

13. A method of operating an enthalpy recovery device in a fuel cell power plant where the enthalpy recovery device has a first portion in fluid communication with an oxidant supply to the fuel cell and a second portion that is in fluid communication with exhaust from the fuel cell, comprising:

selectively controlling an amount of fluid flow through at least one of the portions of the enthalpy recovery device based upon a selected operation condition; and heating the enthalpy recovery device, including preheating oxidant from the oxidant supply before the oxidant is provided to the first portion.

14. The method of claim 13, wherein the operation condition comprises temperature and including at least partially bypassing at least one of the portions of the enthalpy recovery device when the temperature is below a selected threshold.

15. The method of claim 14, including completely bypassing at least one of the portions.

16. The method of claim 15, including allowing moisture or liquid within either of the portions to freeze.

17. The method of claim 13, wherein the selected operation condition is a start up of the fuel cell and including completely bypassing the first portion during the start up.

18. The method of claim 13, including heating the fuel cell exhaust and introducing the heated exhaust into the enthalpy recovery device with the oxidant.

19. A method of operating an enthalpy recovery device in a fuel cell power plant where the enthalpy recovery device has a first portion and fluid communication with an oxidant supply to the fuel cell and a second portion that is in fluid communication with exhaust from the fuel cell, comprising:

selectively controlling an amount of fluid flow through at least one of the portions of the enthalpy recovery device for completing bypassing at least one of the portions of the enthalpy recovery device when a temperature is below a selected threshold; and allowing moisture or liquid within at least one of the portions of the enthalpy recovery device to freeze.

* * * * *

UNITED STATES PATENT AND TRADEMARK OFFICE
CERTIFICATE OF CORRECTION

| | | |
|---|---|---|
| PATENT NO. | : 6,986,959 B2 | |
| DATED | : January 17, 2006 | |
| INVENTOR(S) | : Clark, Thomas M. et al. | |

It is certified that error appears in the above-identified patent and that said Letters Patent is hereby corrected as shown below:

<u>Column 6,</u>
Line 54, replace "hearer" with -- heater --.
Line 54, replace "hear" with -- heat --.

<u>Column 7,</u>
Line 47, replace "vower" with -- power --.

Signed and Sealed this

Sixteenth Day of May, 2006

JON W. DUDAS
*Director of the United States Patent and Trademark Office*